United States Patent
Shyam Sunder et al.

(10) Patent No.: US 12,461,959 B2
(45) Date of Patent: Nov. 4, 2025

(54) SYSTEM AND METHOD FOR DATA MANAGEMENT

(71) Applicant: Siemens Schweiz AG, Zürich (CH)

(72) Inventors: Swathi Shyam Sunder, Bengaluru (IN); Nataliia Rümmele, St. Pölten (AT); Tobias Aigner, Munich (DE); Yogesh Kamath, Karnataka (IN); Rani Joseph, Bangalore (IN); Yogesh Borkhade, Karnataka (IN); Prithvi Raj Ramakrishnaraja, Secundrabad (IN)

(73) Assignee: Siemens Schweiz AG, Zürich (CH)

( * ) Notice: Subject to any disclaimer, the term of this patent is extended or adjusted under 35 U.S.C. 154(b) by 0 days.

(21) Appl. No.: 18/695,441

(22) PCT Filed: Sep. 26, 2022

(86) PCT No.: PCT/EP2022/076632
§ 371 (c)(1),
(2) Date: Mar. 26, 2024

(87) PCT Pub. No.: WO2023/046945
PCT Pub. Date: Mar. 30, 2023

(65) Prior Publication Data
US 2024/0419714 A1    Dec. 19, 2024

(30) Foreign Application Priority Data
Sep. 27, 2021   (EP) .................... 21199096

(51) Int. Cl.
*G06F 16/353*   (2025.01)
*G06F 16/332*   (2025.01)
*G06F 16/36*    (2019.01)

(52) U.S. Cl.
CPC ........ *G06F 16/353* (2019.01); *G06F 16/3326* (2019.01); *G06F 16/367* (2019.01)

(58) Field of Classification Search
CPC ...... G06F 16/353; G06F 16/35; G06F 16/367; G06F 16/3326; G06F 16/20; G06F 16/2282; G06F 16/285; G06F 16/258
(Continued)

(56) References Cited

U.S. PATENT DOCUMENTS 10,346,401 B2 *  7/2019  Abolhassani ..... G06F 16/24549
2012/0102022 A1 *  4/2012  Miranker ............. G06F 16/258
                                                                707/E17.014
(Continued)

OTHER PUBLICATIONS

International Search Report & Written Opinion for PCT/EP2022/076632 mailed on Jan. 2, 2023.
(Continued)

*Primary Examiner* — Shahid A Alam
(74) *Attorney, Agent, or Firm* — Schmeiser, Olsen & Watts, LLP (57) ABSTRACT

A system and method for data management is provided. The method includes obtaining a dataset from a data source by a processing unit. The dataset includes a plurality of datapoints, and each of the datapoints belongs to a column among a plurality of columns. Further, an ontology label for at least one column in the dataset is predicted using a machine learning model. The predicted ontology label is associated with an ontology comprising a plurality of ontology labels. Further, a mapping between the dataset and the ontology is generated based on the relation between the predicted ontology label and the column. Furthermore, the datapoints are classified with respect to the ontology labels based on the mapping generated. The classified datasets are outputted on a user interface.

8 Claims, 6 Drawing Sheets

(58) Field of Classification Search
USPC .......................................................... 707/737
See application file for complete search history.

(56) References Cited

U.S. PATENT DOCUMENTS

| 2014/0214857 | A1* | 7/2014 | Srinivasan | G06F 16/80 |
| | | | | 707/748 |
| 2015/0205880 | A1* | 7/2015 | Perry | G06F 16/24532 |
| | | | | 707/771 |
| 2020/0234183 | A1* | 7/2020 | Ghatage | G06F 16/285 |
| 2021/0303635 | A1* | 9/2021 | Mostafa | G06F 16/9024 |

OTHER PUBLICATIONS

Ahuja Shilpi et al: "Using Machine Learning to Accelerate Data Wrangling", 2016 IEEE 16th International Conference On Data Mining Workshops (ICDMW), IEEE, Dec. 12, 2016 (Dec. 12, 2016), pp. 343-349.

* cited by examiner

SYSTEM AND METHOD FOR DATA MANAGEMENT

CROSS-REFERENCE TO RELATED APPLICATIONS

This application claims priority to PCT Application No. PCT/EP2022/076632, having a filing date of Sep. 26, 2022, which claims priority to EP Application No. 21199096.5, having a filing date of Sep. 27, 2021, the entire contents both of which are hereby incorporated by reference.

FIELD OF TECHNOLOGY

The following relates to data management, and more particularly relates to a system and method for data management.

BACKGROUND

In an industrial scenario, data may be generated during each phase of a product's lifecycle. The data thus generated may be associated with, for example, planning, design, manufacturing, operation or maintenance of the product. Each of the phases correspond to a specific domain and are associated with different forms of structured data. The structured data may be stored in data stores.

Conventionally, integrating the structured data corresponding to different domains involves the use of Extract, Transform, Load (ETL) processes for mapping the structured data to an ontology. In the recent past, machine learning techniques have also been employed to automate parts of the ETL processes.

A data labeling system using machine learning models is known from the paper "Using Machine Learning to Accelerate Data Wrangling", Ahuja Shilpi et al, 2016 IEEE 16th International Conference on Data Mining Workshops (ICDMW).

However, training machine learning models requires large datasets. The datasets are annotated with appropriate labels from a schema. However, this annotation is typically done by skilled personnel including, but not limited to, domain experts, data scientists or engineers. The annotations are quite cumbersome and time consuming for the skilled personnel. The amount and quality of these annotations, which serve as training data for the machine learning model also influence the performance and accuracy of the machine learning model.

In light of the above, there exists a need for improving accuracy of annotation of datasets while requiring minimal efforts from skilled personnel.

SUMMARY

An aspect relates to a system and method for data management. The aspect of embodiments of the present invention is achieved by a method for data management as disclosed herein.

In embodiments, the method comprises obtaining a dataset from a data source, by a processing unit. The dataset comprises a plurality of datapoints, and each of the datapoints belong to a column among a plurality of columns. In embodiments, the method further comprises predicting an ontology label for at least one column in the dataset using a machine learning model. The predicted ontology label is associated with an ontology comprising a plurality of ontology labels.

In an embodiment, the method further comprises identifying a relation between at least another column and at least another ontology label from the plurality of ontology labels, based on a user-input received from the user interface. In a further embodiment, the step of identifying the relation between the at least another column and the at least another ontology label comprises receiving the user-input from a user via the user interface. The user input corresponds to assigning the ontology label to the at least another column. Further, one or more attributes associated with the at least another column are determined based on the user-input. Further, the relation is determined based on the one or more attributes associated with the at least another column and one or more properties associated with the ontology label. Furthermore, the machine learning model is trained based on the relation identified.

In an embodiment, predicting the ontology label for the at least one column in the dataset using the machine learning model comprises identifying one or more attributes associated with the column. Further, the one or more attributes are provided as input to the machine learning model. Furthermore, the ontology label is selected from the plurality of ontology labels based on an output of the machine learning model.

In embodiments, the method further comprises generating a mapping between the dataset and the ontology based on the relation between the predicted ontology label and the column. In an embodiment, generating the mapping between the dataset and the ontology comprises structuring the dataset based on the relation between the predicted ontology label and the column. In embodiments, the method further comprises classifying the datapoints with respect to the ontology labels based on the mapping generated. In an embodiment, the method further comprises generating a labelled dataset based on the predicted ontology label.

In embodiments, the method further comprises outputting the classified datasets on a user interface. In an embodiment, the method further comprises generating a machine-readable file comprising mappings between the dataset and the ontology based on the at least one relation. In an embodiment, the method further comprises validating the predicted ontology label based on a user-input received via the user interface.

The aspect of embodiments of the present invention is also achieved by an apparatus for data management as disclosed herein. The apparatus comprises one or more processing units, and a memory unit communicatively coupled to the one or more processing units. The memory unit comprises an active learning module stored in the form of machine-readable instructions executable by the one or more processing units. The active learning module is configured to perform any of the method steps described above.

The aspect of embodiments of the present invention is also achieved by a system for data management as disclosed herein. The system comprises at least one data source, and an apparatus as described above, communicatively to the data source. The apparatus is configured to perform method steps in accordance with any of the method steps described earlier, based on at least one dataset received from the data source.

The aspect of embodiments of the present invention is also achieved by a computer-readable medium, on which program code sections of a computer program are saved, the program code sections being loadable into and/or executable by a processor which performs the method as described above when the program code sections are executed.

The realization of embodiments of the invention by a computer program product (non-transitory computer readable storage medium having instructions, which when executed by a processor, perform actions) and/or a non-transitory computer-readable storage medium has the advantage that computer systems may be easily adopted by installing computer program in order to work as proposed by embodiments of the present invention.

The computer program product may be, for example, a computer program or comprise another element apart from the computer program. This other element may be hardware, for example a memory device, on which the computer program is stored, a hardware key for using the computer program and the like, and/or software, for example a documentation or a software key for using the computer program.

The above-mentioned attributes, features, and advantages of embodiments of the present invention and the manner of achieving them, will become more apparent and understandable (clear) with the following description of embodiments of the invention in conjunction with the corresponding drawings. The illustrated embodiments are intended to illustrate, but not limit embodiments of the invention.

BRIEF DESCRIPTION

Some of the embodiments will be described in detail, with references to the following Figures, wherein like designations denote like members, wherein.

DETAILED DESCRIPTION

Hereinafter, embodiments of the present invention are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

Figure 1A:
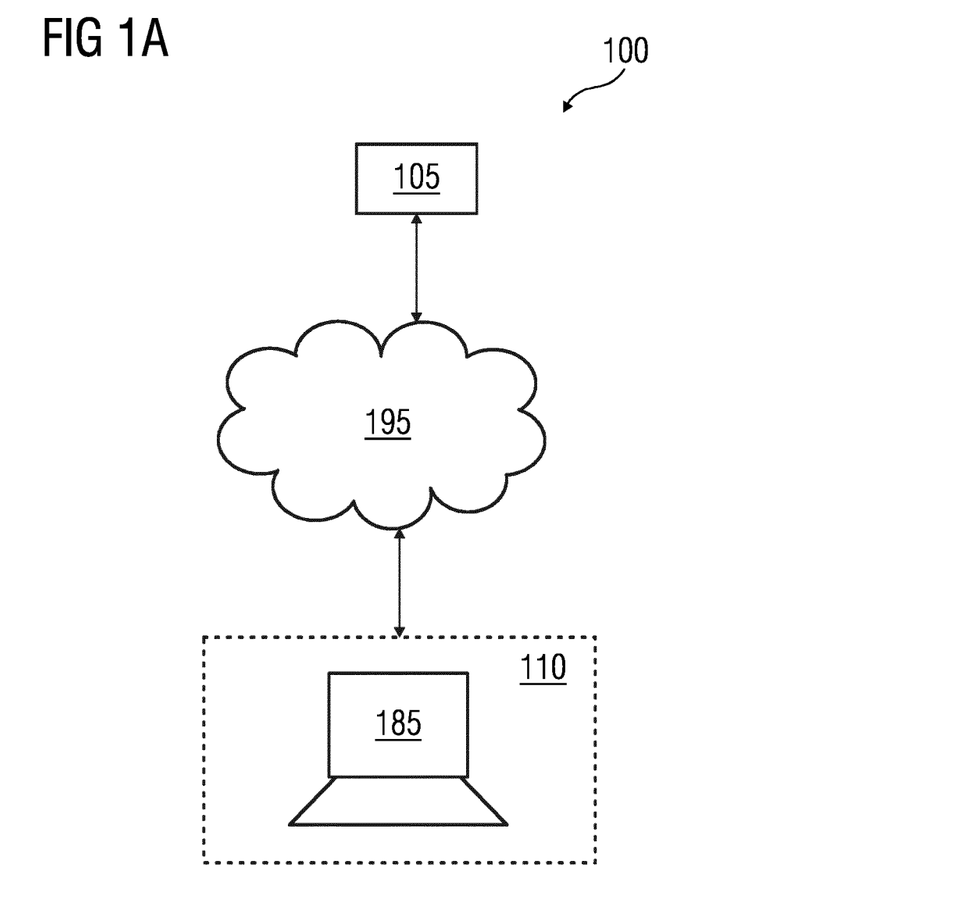
FIG. 1A illustrates a block diagram of a system comprising an apparatus for data management, in accordance with an embodiment of the present invention.

FIG. 1A illustrates a system 100 comprising an apparatus 105 for data management, in accordance with an embodiment of the present invention. The apparatus 105 is communicatively coupled to at least one data source. The apparatus 105 generates mappings between a dataset and an ontology for automatically assigning ontology labels to datapoints within one or more datasets. The term 'ontology' as used herein refers to a graph (database) schema corresponding to a predetermined domain. The ontology may be, for example, determined based on inputs from a user. In another example, the ontology may be determined based on an identity of the data source from where datasets are obtained. The schema may provide logical structure associated with storing of datasets in a specific database.

Figure 1B:
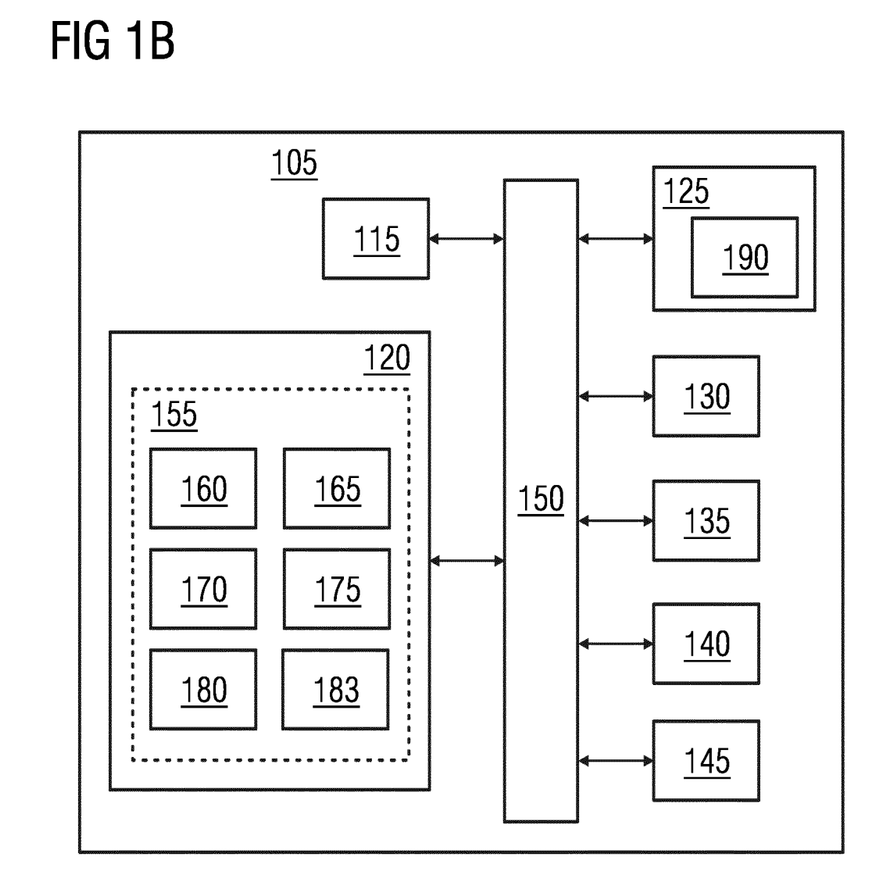
FIG. 1B illustrates a block diagram of the apparatus for data management, in accordance with an embodiment of the present invention.

The apparatus 105 comprises a processing unit 115, a memory 120, a storage unit 125, a communication unit 130, a network interface 135, an input unit 140, an output unit 145, a standard interface or bus 150 as shown in FIG. 1B. The apparatus 105 may be a (personal) computer, a workstation, a virtual machine running on host hardware, a microcontroller, or an integrated circuit. As an alternative, the apparatus 105 may be a real or a virtual group of computers (the technical term for a real group of computers is "cluster", the technical term for a virtual group of computers is "cloud").

The term 'processing unit', as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 115 may also include embedded controllers, such as generic or programmable logic devices or arrays, application specific integrated circuits, single-chip computers, and the like. In general, the processing unit 115 may comprise hardware elements and software elements. The processing unit 115 may be configured for multithreading, i.e., the processing unit 115 may host different calculation processes at the same time, executing the either in parallel or switching between active and passive calculation processes.

The memory 120 may include one or more of a volatile memory and a non-volatile memory. The memory 120 may be coupled for communication with the processing unit 115. The processing unit 115 may execute instructions and/or code stored in the memory 120. A variety of computer-readable storage media may be stored in and accessed from the memory 120. The memory 120 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. The memory 120 comprises an active learning module 155 stored in the memory 120 in the form of machine-readable instructions and executable by the processing unit 115. These machine-readable instructions when executed by the processing unit 115 causes the processing unit 115 to map the dataset to an ontology.

The active learning module 155 comprises a data acquisition module 160, a transformation module 165, a training module 170, a prediction module 175, a mapping module 180 and a rendering module 183. The data acquisition module 160 is configured to obtain the at least one dataset from a data source. The at least one data source may include, but not limited to, databases, storage mediums and client devices. Non-limiting examples of client devices include workstations, personal computers, personal digital assistants and smart phones. The dataset comprises a plurality of datapoints. Each of the datapoints belong to a column among a plurality of columns.

The transformation module 165 is configured for transforming the dataset based on a transformation pattern. The training module 170 is configured to train a machine learning model for predicting an ontology label corresponding to a column. The prediction module 175 is configured to predict an ontology label for at least one column in the dataset using the machine learning model. The mapping module 180 is configured to generate a mapping between the dataset and the ontology based on the relation between the predicted ontology label and the column. The mapping module 180 is further configured to classify the datapoints with respect to the ontology labels based on the mapping generated. The rendering module 183 is configured to output the classified datasets on a user interface 185.

In the present embodiment, the data source is a client device 110. The user interface 185 is provided on the client device 110 through a web-based application or a client-based application. The rendering module 180 is further configured for generating a labelled dataset based on the predicted ontology label.

The storage unit 125 comprises a non-volatile memory which stores predefined at least one database schema, i.e., ontology associated with one or more domains. The database schema is stored as a computer-readable representation of properties and relationships between entities. Each of the entities may be associated with an ontology label. Here, the term 'entity' refers to a unit of data that may be classified into a predefined category. Further, an entity may also have relationships with other entities. Further, the storage unit 125 may also include a database 190 that stores schemas associated with various domains. A database schema model relations between an entity & a corresponding ontology label and may also model relationships between entities.

The communication unit 130 enables the apparatus 105 to communicate with the data source. The communication unit 130 may support different standard communication protocols such as Transport Control Protocol/Internet Protocol (TCP/IP), Profinet and Profibus.

The input unit 140 may include input means such as keypad, touch-sensitive display, camera, etc. capable of receiving input signal. The output unit 145 may include output means such as a display. The bus 150 acts as interconnect between the processing unit 115, the memory 120, the storage unit 125, and the network interface 135.

The client device 110 enables a user to interact with the apparatus 105 through the user interface 185. In an embodiment, the client device 110 is connected to the apparatus 105 via a network 195, for example, local area network (LAN), wide area network (WAN), Wi-Fi, etc. In an embodiment, the apparatus 105 is deployed in a cloud computing environment. As used herein, "cloud computing environment" refers to a processing environment comprising configurable computing physical and logical resources, for example, networks, servers, storage, applications, services, etc., and data distributed over the network 195, for example, the internet. The cloud computing environment provides on-demand network access to a shared pool of the configurable computing physical and logical resources.

Those of ordinary skill in the conventional art will appreciate that the hardware depicted in FIGS. 1A and 1B may vary for different implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter, network connectivity devices also may be used in addition or in place of the hardware depicted. The depicted example is provided for the purpose of explanation only and is not meant to imply architectural limitations with respect to the present disclosure.

In an embodiment, the client device 110 may be used by the user, to upload at least one dataset to the apparatus 105 for generating mappings between the dataset and an ontology. The mappings may be accessed by the user via the user interface 185. In an embodiment, a request may be sent to the apparatus 105 to access the mappings via the network 195. The term 'mappings' as used herein may refer to labelled datasets as well relations between columns in the dataset to ontology labels in the ontology.

Figure 2:
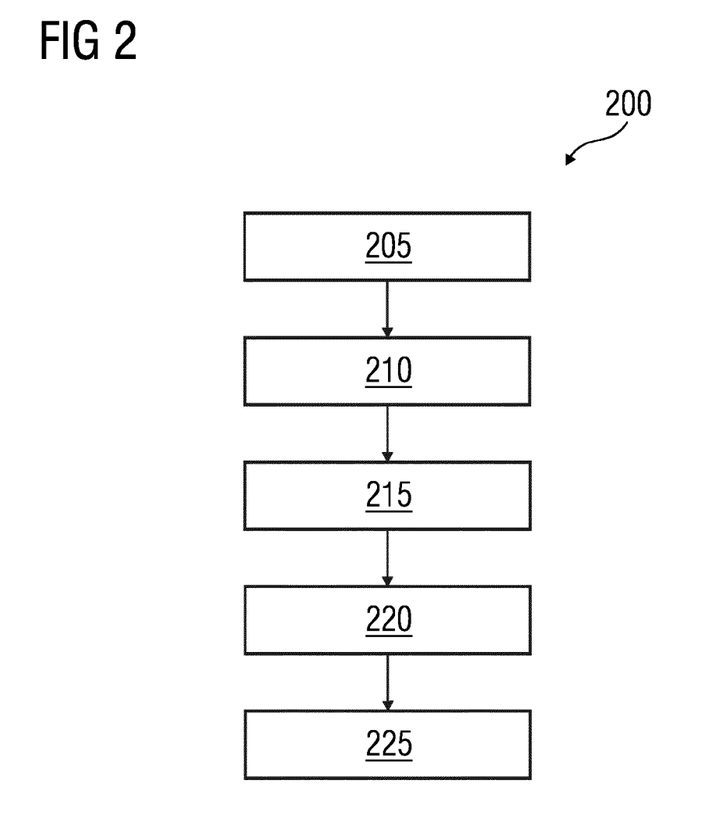
FIG. 2 shows an exemplary method for data management, in accordance with an embodiment of the present invention.

FIG. 2 shows an exemplary method of data management, in accordance with an embodiment of the present invention. More specifically, the present embodiment relates to annotate or label datasets based on an ontology.

At step 205, a dataset is obtained from a data source, by the processing unit 115. The dataset comprises a plurality of datapoints. Each of the datapoints belong to a column among a plurality of columns. The term column as used herein refers to a label assigned to a predefined category of data. For example, a column 'Age' may be associated with ages of one or more individuals. The column 'age' may be associated with values such as 24, 36, 27 etc. corresponding to the ages of different individuals. The dataset comprises a plurality of columns. For example, a dataset associated with employee data may comprise a plurality of columns 'Column 1', 'Column 2', 'Column 3' etc.

The dataset may be obtained in formats including but not limited to, CSV, Excel or from databases such as MySQL, MSSQL, PostgreSQL. In an embodiment, the data source is the client device 110 and the dataset may be stored in a secondary memory (not shown) associated with the client device 110. The user may provide an input to the client device 110 for uploading the dataset from the secondary memory to the apparatus 105. In an embodiment, the user may provide an input to the client device 110 for loading the dataset from the storage unit 125 of the apparatus 105. Similarly, a plurality of datasets from various data sources may be uploaded.

Upon uploading, the dataset may be further transformed based on a transformation pattern. For example, the dataset may store data corresponding to the columns in concatenated form. In the present example, the dataset comprises columns 'Column 1', 'Column 2', 'Column 3' etc. For a first record in the dataset, the 'Column 1' may be Mark, 'Column 2' may be 37 and 'Column 3' may be 'Manager'. In the dataset, the first record may be stored as a concatenated string Mark; 37; Manager. Similarly, the dataset may structure the records in various formats. In order to map the columns to the ontology labels, the structured data are segregated into columns based on the transformation pattern. In the present example, the structured data is segregated into columns based on a splitting parameter as explained using FIG. 3A.

Figure 3A:
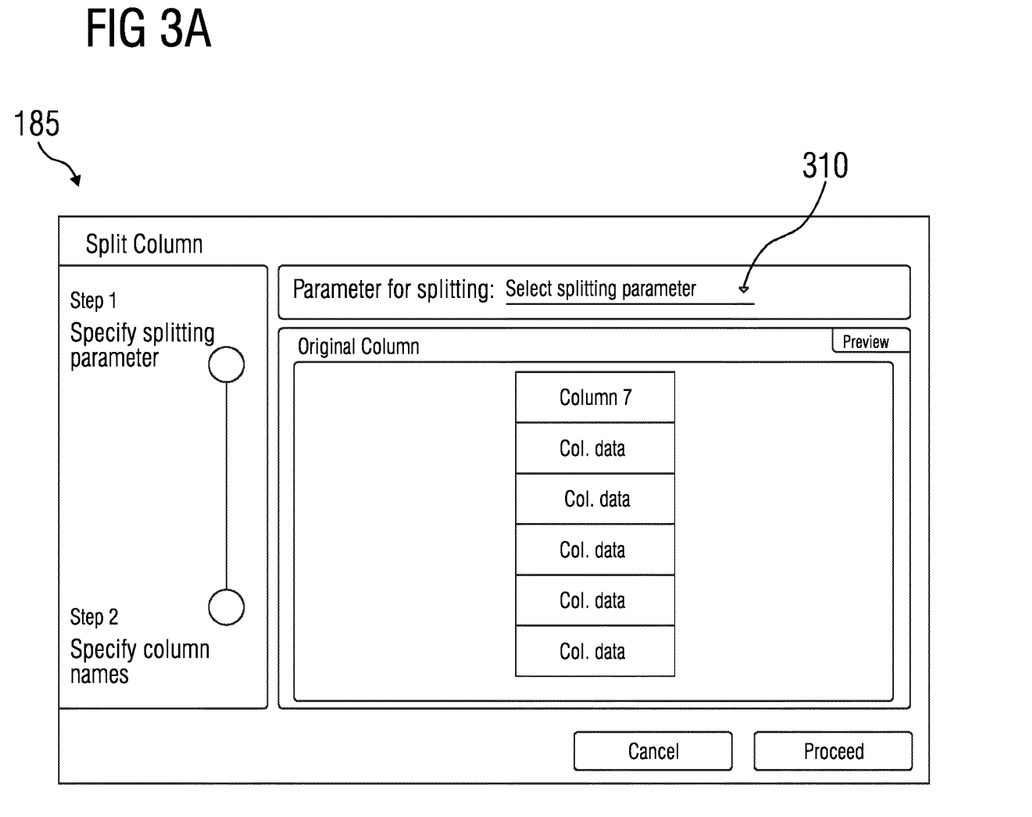
FIG. 3A illustrates an example of a user interface displaying an option for the user to specify the splitting parameter, in accordance with an embodiment of the present invention.

FIG. 3A illustrates an example of the user interface 185 displaying an option for the user to specify the splitting parameter. The user may specify the splitting parameter using the drop-down option 310 provided against the field 'Parameter for splitting'. The splitting parameter may be any alphanumeric character or special character that may indicate a distinction between data pertaining to various columns. Non-limiting examples of splitting parameters include comma(,), semi-colon(;), hyphen(-), etc. In the present example shown in FIG. 3A, the splitting parameter is defined for 'Column 7', to split data in Column 7 into multiple columns. In the previous example of employee data, the splitting parameter may be a semicolon. Upon selecting the splitting parameter, the user is also provided an option to specify names for each of the columns produced upon splitting of the original column.

In an embodiment, the transformation pattern is determined based on a predefined logic. For example, the predefined logic may be associated with code-based transformation of the dataset. The code may be predefined by a technical user and stored in the memory 120 of the apparatus 105. The columns are further rendered on the user interface 185.

In addition to the above, the apparatus 105 may also provide the user with options for editing the columns rendered on the user-interface. For example, the options for editing the columns may include, but are not limited to, deleting, merging, rearranging or hiding specific columns from the user-interface. The user-interface may enable the user to interact with the columns using different gestures including, but not limited to, drag and drop, scrolling, pinching and tapping. It must be understood by a person skilled in the conventional art that embodiments of the invention disclosed herein may also be extended to any type of user interface or gestures as may be known to a person skilled in the conventional art.

In an embodiment, a relation between at least one of the columns and at least one ontology label among a plurality of ontology labels is identified, based on a user-input. The plurality of ontology labels is associated with a predefined ontology. In an example, the user may select the ontology from a list of predefined ontologies. In an implementation, the ontology may be selected from a drop-down list comprising names of various ontologies, provided on the user interface 185. The user may also import the ontology from the database 190.

The user-input corresponds to assigning the ontology label to the at least one column. For example, the user interface 185 may provide an option to the user to select the ontology label from a list of ontology labels in the ontology. The user assigns an ontology label to one of the columns by, for example, selecting the ontology label from the list.

Figure 3B:
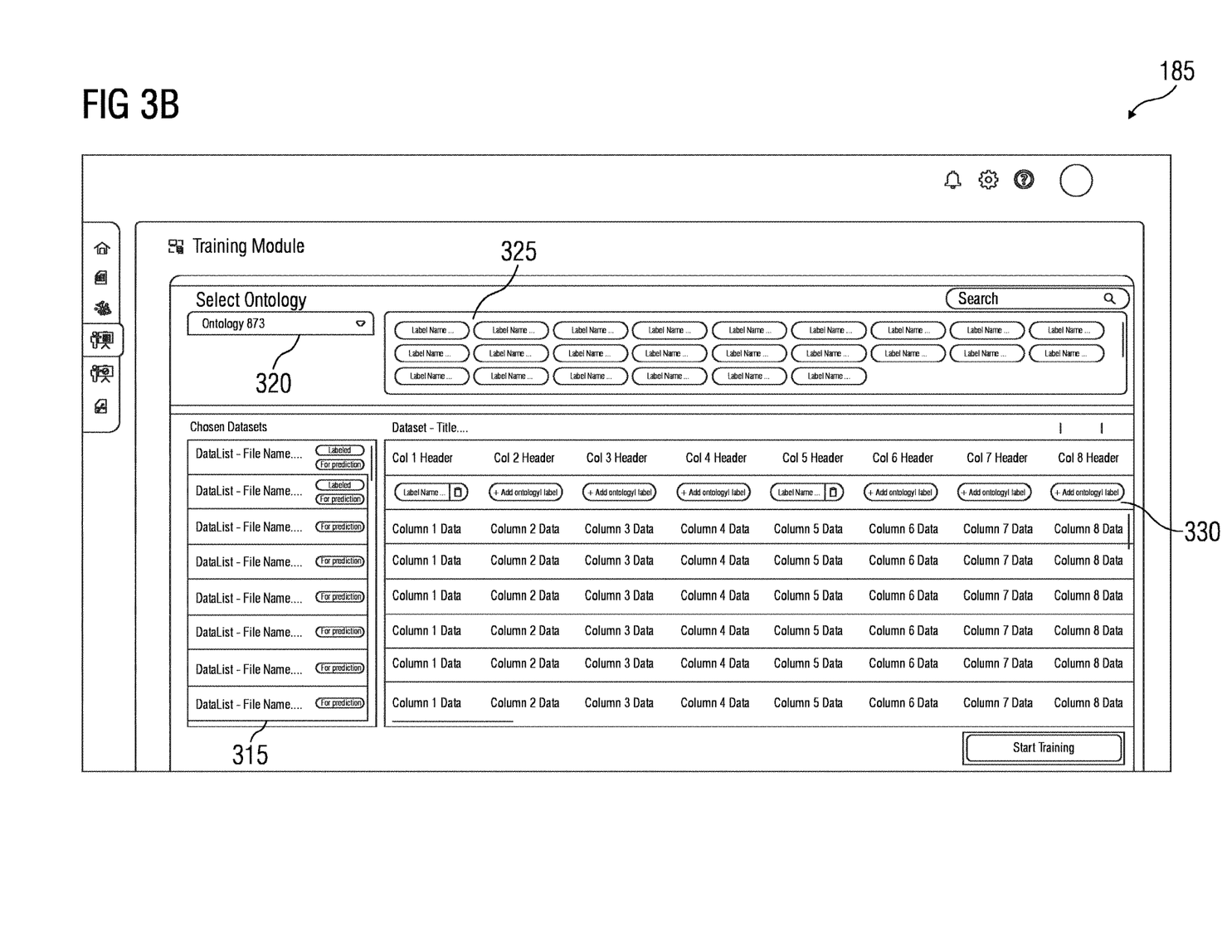
FIG. 3B illustrates an example of the user interface displaying an option for the user to assign ontology labels for one or more columns, in accordance with an embodiment of the present invention.

FIG. 3B illustrates an example of the user interface 185 displaying an option for the user to assign ontology labels for one or more columns. A plurality of datasets are indicated by names under a section 315 of the user interface 185. Further, the user may select at least one dataset from the plurality of datasets by clicking on the respective portion on the user-interface.

The user interface 185 also enables the user to select the ontology from a plurality of schemas indicated in a drop-down menu 320. In the present example, the ontology selected is as 'Ontology 873'. Upon selecting the ontology, a list of ontology labels associated with 'Ontology 873' are displayed in section 325 of the user interface 185.

In an example, the user may assign the ontology label 'Name' to a first column 'Column 1' associated with the dataset. Upon mapping of the column to an ontology label 'Name', the first column is renamed as 'Name'. In the present example, the user uses a drag-and-drop gesture for selecting the ontology label from the list of ontology labels in section 325 and assign the ontology label to a column in section 330. Similarly, the user may map any number of columns in the dataset to the ontology labels associated with the ontology.

Further, the active learning module 155 identifies a relation between the user-assigned ontology label and the column. In an embodiment, the relation is identified based on attributes associated with datapoints in the column and properties associated with the ontology label. For example, the attributes may include, data type, domains, ranges, distribution of the data etc. The properties associated with the ontology label may include value constraints, cardinality constraints, domains, ranges etc. Subsequently, a machine learning model is trained based on the relation identified. In general, a machine learning model mimics cognitive functions that humans associate with other human minds. By training, the machine learning model is able to adapt to new circumstances and to detect and extrapolate patterns. More specifically, parameters of the machine learning model are adapted, by training, to detect and extrapolate patterns associated with new datasets. The parameters of the machine learning models may be adapted iteratively by several steps of training. Non-limiting examples of training methods include supervised learning, semi-supervised learning and/or active learning. Furthermore, representation learning (an alternative term is "feature learning") may also be used.

The machine learning model may comprise a neural network, a support vector machine, a decision tree and/or a Bayesian network, and/or the machine learning model may be based on k-means clustering, Q-learning, genetic algorithms and/or association rules. A neural network may be a deep neural network, a convolutional neural network or a convolutional deep neural network. Furthermore, a neural network may be an adversarial network, a deep adversarial network and/or a generative adversarial network.

As the user maps a given column to an ontology label, the machine learning model learns a relationship between the column and the ontology label assigned. During the learning phase, the machine learning model is provided one or more inputs and expected outputs corresponding to the one or more inputs. In an implementation, the one or more inputs comprise values of features associated with the column. In another implementation, the one or more inputs comprise values of features of datapoints in the column. Similarly, in another implementation, the expected outputs may include a value indicating at least one property of the assigned ontology label, rather than ontology labels themselves.

During training phase, weights of the machine learning model are adapted to predict the ontology label corresponding to any given column. More specifically, output nodes of the machine learning model generate an output indicative of the predicted ontology label. Upon training, the machine learning model may map datasets from any given data source to ontology labels in the ontology.

Referring back to FIG. 2, at step 210, an ontology label is predicted for at least one column in the dataset using the machine learning model. The at least one column is any column in the dataset that is not assigned an ontology label by the user. For example, the at least one column may include 'Column 3' of the dataset. In order to predict the ontology label, one or more features associated with the at least one column is provided to the machine learning model. The output of the machine learning model indicates a predicted ontology label for the at least one column. In the present example, the predicted ontology label may be 'Title' for 'Column 3'.

At step 215, a mapping between the dataset and the ontology is generated based on the relation between the predicted ontology label and the column. More specifically, the mapping indicates one-to-one relationships between the columns in the dataset and a corresponding predicted ontology label. In an embodiment, generating the mapping comprises structuring the dataset based on the relation between the predicted ontology label and the column. For example, datapoints associated with each of the columns in the dataset is listed under the predicted ontology label.

At step 220, the datapoints are classified with respect to the ontology labels based on the mapping generated. The datapoints are classified by saving the datapoints in each of the columns against a corresponding predicted ontology label in a storage location. The storage location may be specified by the user or may be a default location.

Figure 3C:
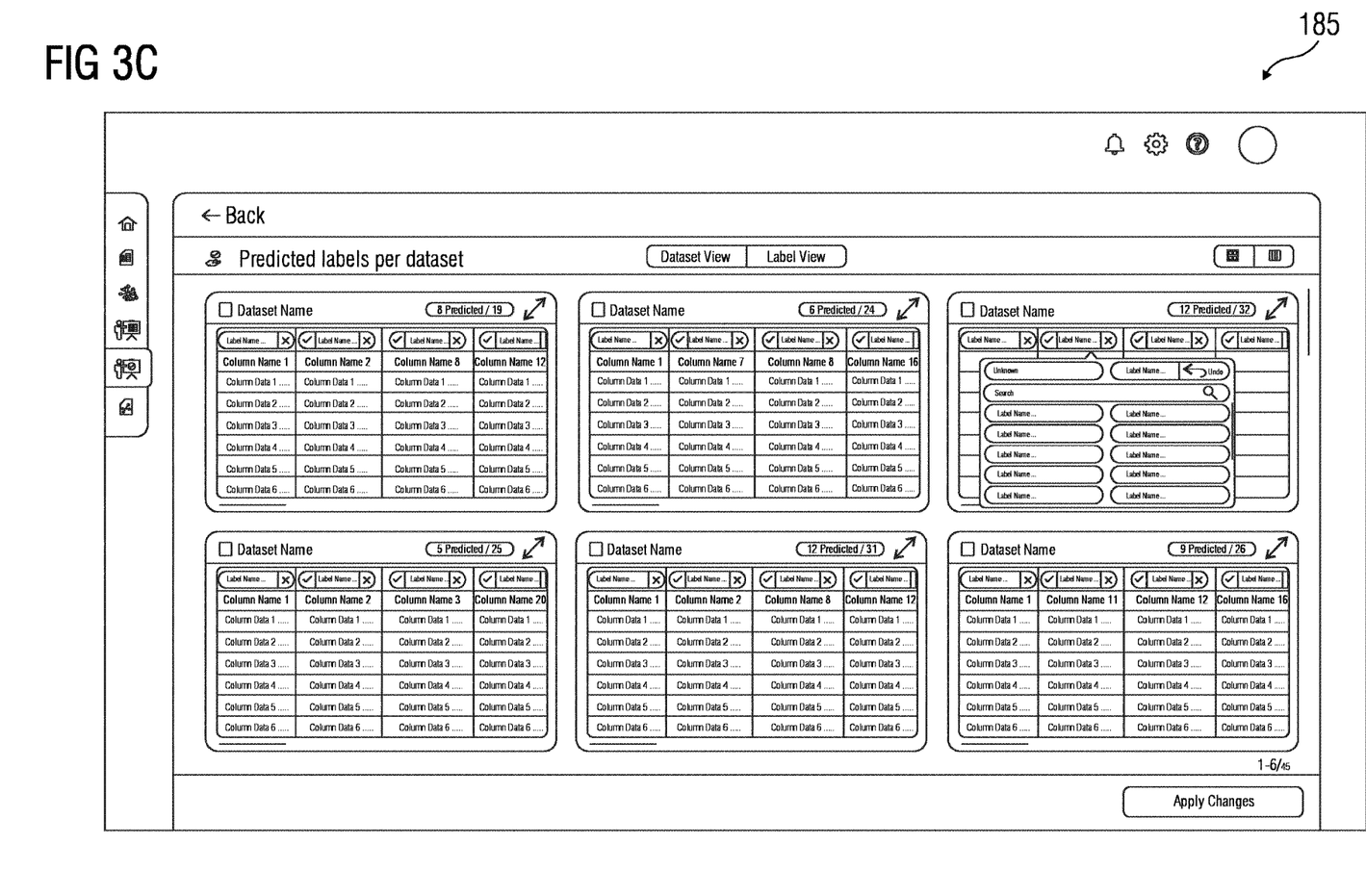
FIG. 3C illustrates an example of the user interface providing an option to the user for validation of the predicted ontology label, in accordance with an embodiment of the present invention.

At step 225, the classified datapoints are outputted on a user interface. FIG. 3C illustrates an example of the user interface 185 providing an option to the user for validation of predicted ontology labels for a plurality of datasets. The user interface 185 displays a tick mark (✓) and a cross mark (x) next to an ontology label predicted for a column in a dataset. The user may validate the ontology label by clicking on ✓ or x. For example, if the prediction module 175 has assigned the right ontology label to the column, the user may click on the tick mark for accepting the ontology label. Otherwise, the user may click on x for rejecting the ontology label. If the user rejects the ontology label, the active learning module 155 further generates a notification, on the user interface 185, requesting the user to manually select the correct ontology label for the column from a list of ontology labels associated with the ontology. Upon validating the ontology labels for the datasets, the user may click on 'Apply changes' tab in order to assign the validated ontology labels to the columns in the datasets.

The graphical representation may also include, for example, a nodal structure representing relations between the columns and ontology labels associated with the ontology. Further, the user may also be provided an option to validate the mappings between the columns and the ontology labels.

In an embodiment, a labelled dataset is generated based on the assigned ontology labels and the predicted ontology labels. In other words, the labelled dataset comprises datapoints from the dataset along with corresponding ontology labels from the ontology.

In an embodiment, a machine-readable file comprising mappings between the at least one dataset and the ontology is generated based on the at least one correlation. For example, the user may select an 'export' option on the user interface 185 in order to initiate generation of the machine-readable file. Upon selecting 'export' option, the machine-readable file is generated by exporting the mappings into a suitable file format. In an embodiment, the computer-readable file is generated in JSON, CSV or R2RML format. In an embodiment, the machine-readable file comprises the labelled dataset comprising datapoints along with corresponding ontology labels from the ontology.

Embodiments of the present invention facilitate faster mapping of datasets to a target ontology or schema, with minimum intervention from the user. As a result, time required for training of the machine learning model is also reduced. Further, human errors associated with labeling is reduced as the number of ontology labels manually assigned by the user is limited through prediction.

Embodiments of the present invention are not limited to a particular computer system platform, processing unit, operating system, or network. One or more aspects of embodiments of the present invention may be distributed among one or more computer systems, for example, servers configured to provide one or more services to one or more client computers, or to perform a complete task in a distributed system. For example, one or more aspects of embodiments of the present invention may be performed on a client-server system that comprises components distributed among one or more server systems that perform multiple functions according to various embodiments. These components comprise, for example, executable, intermediate, or interpreted code, which communicate over a network using a communication protocol. Embodiments of the present invention are not limited to be executable on any particular system or group of system, and is not limited to any particular distributed architecture, network, or communication protocol.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for data management, the method comprising:
    obtaining a dataset from a data source, by a processing unit, wherein the dataset comprises a plurality of datapoints, and wherein each of the datapoints belong to a column among a plurality of columns;
    predicting an ontology label for at least one column in the dataset using a machine learning model, wherein the predicted ontology label is associated with an ontology comprising a plurality of ontology labels;
    generating a mapping between the dataset and the ontology based on the relation between the predicted ontology label and the column;
    classifying the datapoints with respect to the ontology labels based on the mapping generated;
    outputting the classified datasets on a user interface;
    providing an option to a user on the user interface for validation of predicted ontology labels for a plurality of datasets by a user-input via the user interface;
    if the user rejects the respective predicted ontology label, requesting the user to manually select the correct ontology label for the column from a list of ontology labels associated with the ontology for assigning the correct ontology label to the column;
    teaching the machine learning model a relationship between the column and the assigned ontology label;
    identifying a relation between at least another column and at least another ontology label from the plurality of ontology labels, based on a user-input received from the user interface; and
    training the machine learning model based on the relation identified;
    wherein identifying the relation between the at least another column and the at least another ontology label from the plurality of ontology labels based on the user-input received from the user interface includes receiving the user-input from a user via the user interface, wherein the user input corresponds to assigning the ontology label to the at least another column; determining one or more attributes associated with the at least another column based on the user-input; and determining the relation based on the one or more attributes associated with the at least another column and one or more properties associated with the ontology label.

2. The method according to claim 1, wherein predicting the ontology label for the at least one column in the dataset using the machine learning model comprises:
    identifying one or more attributes associated with the column;
    providing the one or more attributes as input to the machine learning model; and selecting the ontology label from the plurality of ontology labels based on an output of the machine learning model.

3. The method according to claim 1, generating the mapping between the dataset and the ontology based on the relation between the predicted ontology label and the column comprises:

structuring the dataset based on the relation between the predicted ontology label and the column.

4. The method according to claim 1, further comprising: generating a labelled dataset based on the predicted ontology label.

5. The method according to claim 1, further comprising: generating a machine-readable file comprising mappings between the dataset and the ontology based on the at least one relation.

6. An apparatus for data management, comprising: one or more processing units; and a memory unit communicatively coupled to the one or more processing units, wherein the memory unit comprises an active learning module stored in the form of machine-readable instructions executable by the one or more processing units, wherein the active learning module is configured to perform method steps according to claim 1.

7. A system for data management, comprising:

at least one data source; and an apparatus as claimed in claim 6, communicatively to the at least one data source.

8. A computer program product, comprising a computer readable hardware storage device having computer readable program code stored therein, said program code executable by a processor of a computer system to implement the method according to claim 1.

\* \* \* \* \*